(12) United States Patent
Moran et al.

(10) Patent No.: US 7,647,837 B2
(45) Date of Patent: Jan. 19, 2010

(54) ACTIVE TEMPERATURE DIFFERENTIAL COMPENSATION FOR STRAIN GAGE BASED SENSORS

(75) Inventors: Michael E. Moran, Marysville, OH (US); Sean D. Gregory, Columbus, OH (US); Jason R. Robinson, Columbus, OH (US); John Liu, Columbus, OH (US)

(73) Assignee: Honeywell International Inc., Morristown, NJ (US)

( * ) Notice: Subject to any disclaimer, the term of this patent is extended or adjusted under 35 U.S.C. 154(b) by 6 days.

(21) Appl. No.: 11/897,158

(22) Filed: Aug. 29, 2007

(65) Prior Publication Data

US 2009/0056466 A1      Mar. 5, 2009

(51) Int. Cl.
    *G01L 1/00* (2006.01)
(52) U.S. Cl. ......................................... 73/766
(58) Field of Classification Search ............... 73/766, 73/765

See application file for complete search history.

(56) References Cited

U.S. PATENT DOCUMENTS

| | | | |
|---|---|---|---|
| 3,665,756 A * | 5/1972 | Russell ..................... 73/766 |
| 4,023,864 A | 5/1977 | Lang et al. .................... 303/20 |
| 4,448,078 A * | 5/1984 | Bridges ....................... 73/766 |
| 4,785,673 A | 11/1988 | Aumard .................. 73/862.65 |
| 6,001,666 A | 12/1999 | Diem et al. ..................... 438/52 |
| 6,173,619 B1 * | 1/2001 | Satake et al. ........... 73/862.622 |
| 6,862,937 B2 * | 3/2005 | Fujita et al. ................... 73/766 |
| 6,973,837 B2 * | 12/2005 | Barnett ........................ 73/765 |
| 7,146,862 B2 | 12/2006 | Kosht et al. ................... 73/777 |
| 7,334,483 B2 * | 2/2008 | Sato et al. ..................... 73/708 |

\* cited by examiner

*Primary Examiner*—Lisa M Caputo
*Assistant Examiner*—Octavia Davis
(74) *Attorney, Agent, or Firm*—Kermit D. Lopez; Luis M. Ortiz

(57) ABSTRACT

An active temperature differential compensation for strain gage based sensors. An array of temperature sensors can be placed at the gage locations to measure the difference in temperature that induces strain on the strain gages. The output of the temperature sensor network can be placed in series with the strain gage network to directly compensate the induced voltage caused by the temperature gradient and/or employed as the input of a mathematical algorithm that can compensate the output from the strain gage bridge to dynamically correct unwanted thermally induced strain in the strain gages.

17 Claims, 4 Drawing Sheets

ACTIVE TEMPERATURE DIFFERENTIAL COMPENSATION FOR STRAIN GAGE BASED SENSORS

TECHNICAL FIELD

Embodiments are generally related to sensing systems and methods, more particularly to strain gage based sensors. Embodiments are also related to temperature differential compensation for strain gage based sensors.

BACKGROUND OF THE INVENTION

Materials contract and expand with changes in temperature. Temperature can alter not only the properties of a strain gage element, but also the properties of the base material to which strain gage is attached. Difference in expansion coefficients between the gage and the base material can induce strain between the strain gage and the sensor element Differential expansion and contraction between the strain gage element and the base element introduces errors that are difficult to correct.

The accurate measurement of both static and dynamic strain is frequently used to measure such measurands as load, pressure, torque and acceleration. Conventional strain gages are typically applied to both stationary and rotating components for this purpose but are susceptible to error induced by temperature.

Methods exists which partially correct temperature-induced errors in resistive sensors. Many approaches use a separate temperature responsive element, for example a thermocouple, thermistor or diode. These elements measure a temperature near the sensor and generate a correction signal dependent on the environmental conditions of the sensor. Other approaches involve selection of the thermal coefficients of the bridge circuit and temperature compensating elements, such as resistors to integrally balance the bridge circuit.

A problem with such prior art approaches can arise during dynamic temperature change conditions in which different areas of the sensing element experience temperature changes at different rates, such as during warmup, sudden exposure to flow fields, brief temperature excursions, or other transient temperature conditions that can often result in varying temperatures at the location of each strain gage. These variations result in errors in output due to temperature induced strain in individual gages.

Strain gage based sensors experiencing temperature gradients between strain gage locations exhibit errant output. Existing temperature compensation schemes do not remove this effect. Failure to address these effects results in measurement uncertainty.

Based on the foregoing, it is believed that a need exists for a temperature differential compensation network to measure the temperature difference between the strain gage sensor locations to dynamically correct the temperature induced error.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved strain gage sensor system.

It is another aspect of the present invention to provide an improved temperature differential compensation for strain gage based sensors.

The aforementioned aspects and other objectives and advantages can now be achieved as described herein. A temperature sensor is placed at each strain gage location creating an array of temperature sensors that measure the temperature difference between the different components of the strain gage bridge that are likely to induce stress/strain on the strain gages. The output of the temperature sensor network can be utilized to correct unwanted thermally induced stress or strain in the strain gages, thereby improving strain gauge measurement accuracy.

In analog method of correction, the output of the temperature sensors can be placed in series as a strain gage network to directly compensate the induced voltage caused by the temperature gradient. The thermal network can act independently of at least one strain gage in the digital method of correction. The output of the thermal network can be used as the input of a mathematical algorithm that can compensate the output from the at least one strain gage. The embodiment differentiates itself from other temperature compensation methods in that it is a dynamic temperature gradient compensation method as opposed to static uniform temperature compensation.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
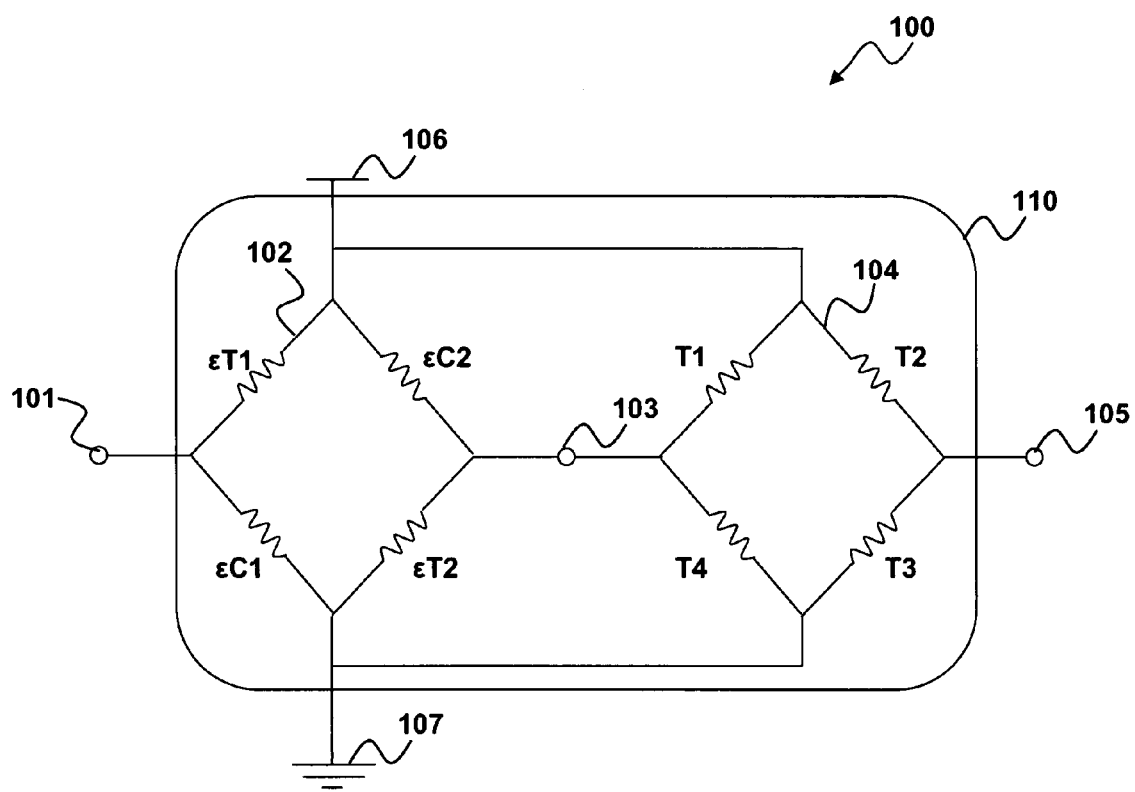
FIG. 1 illustrates a circuit diagram for dynamic differential temperature compensation for strain gage based sensors, which can be implemented in accordance with a preferred embodiment.

Referring to FIG. 1, illustrates a circuit diagram 100 for analog dynamic differential temperature compensation for a strain gage based sensor device 110, which can be implemented in accordance with a preferred embodiment. Strain gage network 102 usually employs strain sensing elements $\epsilon T1$, $\epsilon T2$, $\epsilon C1$ and $\epsilon C2$ electrically connected to form a Wheatstone bridge type circuit. Input voltage 106 can be given to the strain gage network 102 and temperature gage network 104. The total strain and/or the output of the gage network can be equivalent to the difference in strain between tension gages (εT1 and εT2) and compression gages (εC1 and εC2). The output, normally measured between 101 and 103, can be given to temperature compensation network 104, which can also be a Wheatstone bridge type circuit with temperature sensing elements T1, T2, T3 and T4. The output, measured between 103 and 105 of the temperature compensation network 104, can be used to correct unwanted thermally induced error between 101 and 103. The compensated output now becomes the voltage between 101 and 105. The supply voltage for the circuit 100 would be provided across points 106 and 107.

Figure 2:
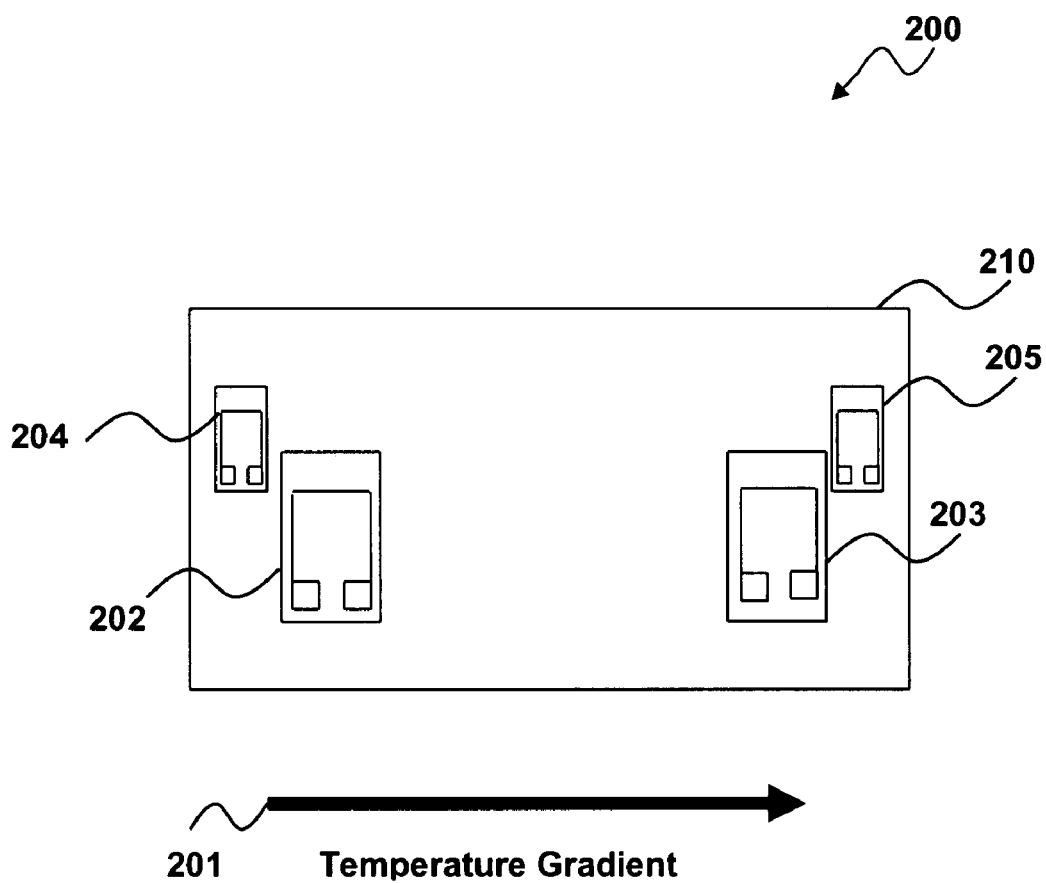
FIG. 2 illustrates a layout example for dynamic differential temperature compensation for strain gage based sensors, which can be implemented in accordance with a preferred embodiment.

Referring to FIG. 2, illustrates a sensing element experiencing a temperature gradient 200, which can be implemented in accordance with a preferred embodiment. The temperature gradient can be in a direction along a strain gage sensing device 210 as indicated by arrow 201. The temperature can be measured at strain sensing device locations 202 (T1 and T2 in FIG. 1) and 203 (C1 and C2 in FIG. 1) using temperature sensing devices. The difference in temperature of the temperature sensors 204 and 205 can be used as the input of a mathematical algorithm that can compensate the output for the strain gage bridge shown in FIG. 1.

Figure 3:
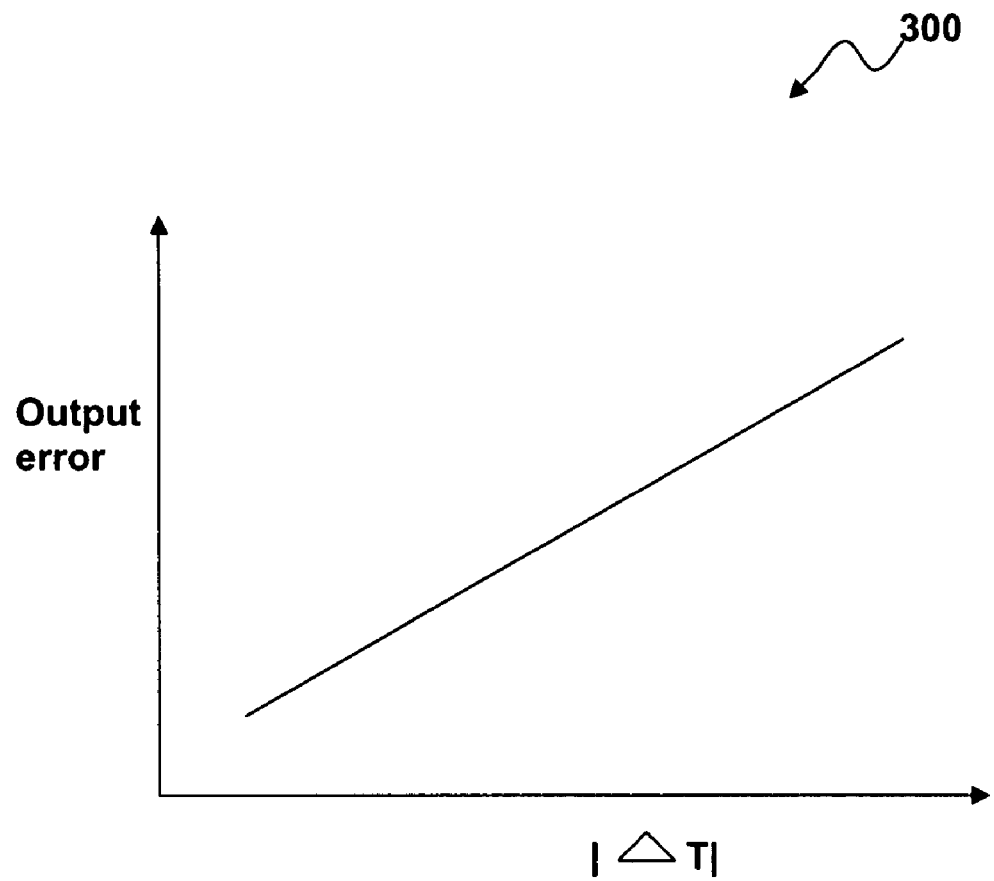
FIG. 3 illustrates a graph depicting output error with respect to difference in temperature, which can be implemented in accordance with a preferred embodiment.

FIG. 3 illustrates a graph 300, depicting output error with respect to difference in temperature at strain gage locations, which can be corrected in accordance with the preferred embodiment. FIG. 3 illustrates that, if the output is looked at as a function of temperature differential, a relationship exists. The graph 300 indicates that the output error changes predictably with temperature differential. If the temperature changes dynamically, temperature gradients, similar to those illustrated, can be induced, thus creating the output error.

Figure 4:
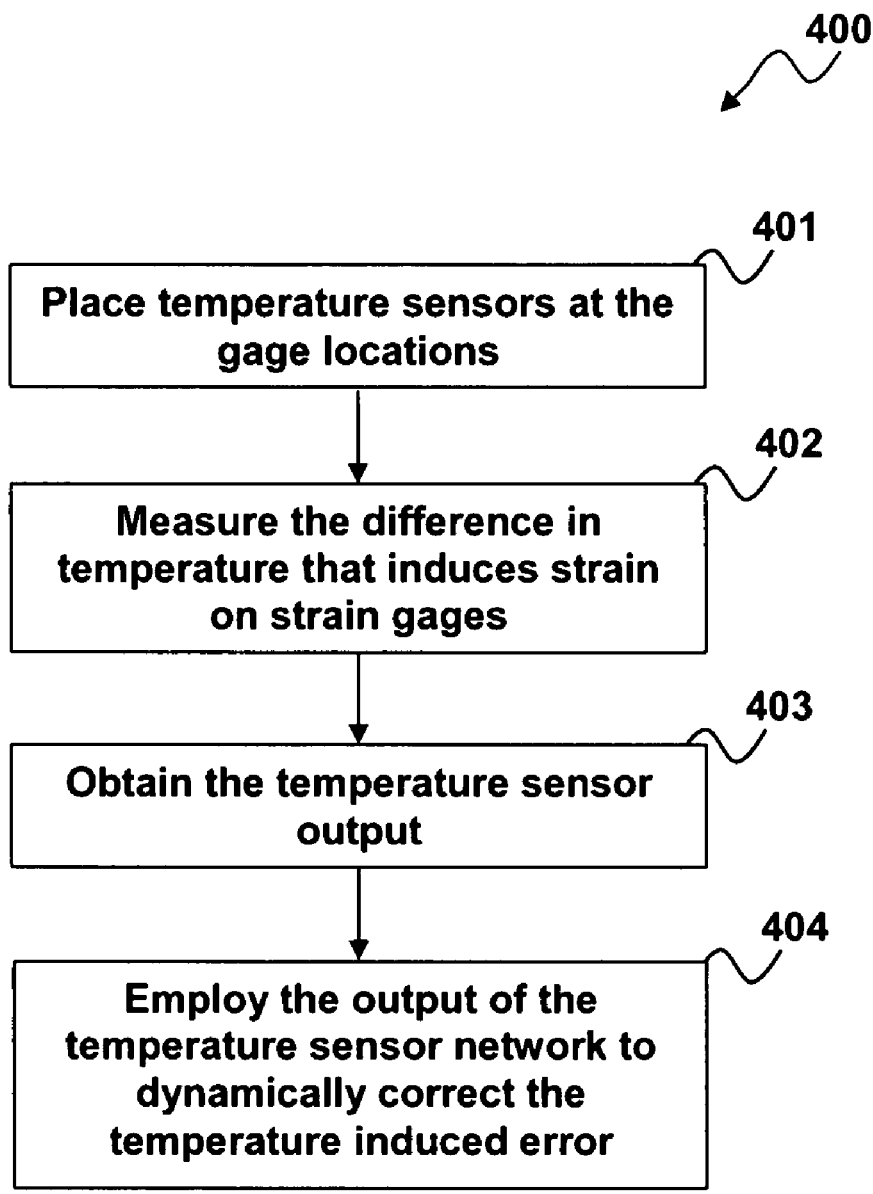
FIG. 4 illustrates a high-level flow chart of operations depicting logical operational steps of a method for dynamic differential temperature compensation for strain gage based sensors, which can be implemented in accordance with an alternative embodiment.

Referring to FIG. 4, illustrates a high-level flow chart of operations depicting logical operational steps of a method 400 for dynamic differential temperature compensation for strain gage based sensors, which can be implemented in accordance with a preferred embodiment. As depicted at block 401, temperature sensors can be placed at the strain gage locations. Next, as indicated at block 402, the difference in temperature that induces strain on the strain gages can be measured. Thereafter, as indicated at block 403, the output of the temperature sensor network can be obtained. Next, as depicted at block 404, the temperature sensor output can be employed to dynamically correct temperature induced strain in the strain gage.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A differential temperature compensation method for strain gage based sensors comprising:
   providing an array of temperature sensing devices at locations along a strain gage, wherein said strain gage comprises a plurality of tension gages and compression gages;
   measuring the temperature differential between said temperature sensing devices provided at said locations; and
   utilizing said temperature differential measured between said temperature sensing devices to dynamically correct thermally induced strain in said strain gage, wherein said thermally induced strain in said strain gage is equivalent to a difference in strain in said tension gages and said compression gages.

2. The method of claim 1 wherein said correction is analog.

3. The method of claim 2 wherein said analog method employs the output of said array of temperature sensing devices placed in series with output from said strain gage to directly compensate the induced voltage caused by a temperature gradient.

4. The method of claim 3 wherein said differential temperature compensation method is used with at least one strain gage based sensor to measure at least one of: load, pressure, torque and acceleration.

5. The method of claim 1 wherein said correction is digital.

6. The method of claim 5 wherein said digital output from the array of temperature sensing devices is processed together with output from said strain gage to directly compensate for said output from said strain gage.

7. The method of claim 6 wherein said differential temperature compensation method is used with at least one strain gage based sensor to measure at least one of: load, pressure, torque and acceleration.

8. The method of claim 1 wherein said method is a dynamic temperature gradient compensation method as opposed to a static compensation.

9. The method of claim 1 wherein said differential temperature compensation method is used with at least one strain gage based sensor to measure at least one of: load, pressure, torque and acceleration.

10. A strain gage sensor system adapted with differential temperature compensation, comprising:
    at least one strain gage device deployed at a strain gage measurement location, wherein said strain gage comprises a plurality of tension gages and compression gages;
    an array of temperature sensing devices wherein individual temperature sensing devices comprising said array of temperature sensing devices are each disposed at various locations along said at least one strain gage;
    wherein measurements of temperature differential between said individual temperature sensing devices are utilized to dynamically correct thermally induced strain in said at least one strain gage, wherein said induced strain in said at least one strain gage is equivalent to a difference in strain in said tension gages and said compression gages.

11. The system of claim 10 wherein analog output comprising said measurements from said individual temperature sensing devices is placed in series with output from said at least one strain gage to directly compensate the induced voltage caused by temperature gradient.

12. The system of claim 11 wherein said array of temperature sensing devices is adapted for use with said at least one strain gage to measure at least one of: load, pressure, torque and acceleration.

13. The system of claim 10 wherein said array of temperature sensing devices are adapted for use with said strain gages to measure at least one of: load, pressure, torque and acceleration.

14. A strain gage sensing system, comprising:
    strain sensing elements electrically connected in the formation of a Wheatstone bridge circuit wherein said strain sensing elements comprise a plurality of tension gages and compression gages;
    temperature sensing elements electrically connected in the formation of a Wheatstone bridge circuit and individually associated with each of said strain sensing elements in the Wheatstone bridge circuit; and
    wherein output measured from said temperature sensing elements is used to compensate for temperature effects on output from said strain sensing elements wherein said output from said strain sensing elements is equivalent to the difference in strain in said tension gages and said compression gages.

15. The system of claim 14 wherein analog output comprising said measurements from said temperature sensing elements are placed in series with output from said strain sensing elements to directly compensate for the induced voltage caused by temperature gradients on said strain sensing elements.

16. The system of claim 15 wherein said temperature sensing elements are adapted for use with stain sensing element of at least one strain gauge gage to measure at least one of: load, pressure, torque and acceleration.

17. The system of claim 14 wherein said temperature sensing elements are adapted for use with said strain sensing elements to measure at least one of: load, pressure, torque and acceleration.

* * * * *